United States Patent [19]

Von Felgel

[11] 3,708,616

[45] Jan. 2, 1973

[54] COLOR TV REPRODUCTION UNIT USING LASER BEAMS

[75] Inventor: Richard Von Felgel, Farnholz, Germany

[73] Assignee: Fernseh GmbH, Darmstadt am Alten Bahnhof, Germany

[22] Filed: Nov. 2, 1970

[21] Appl. No.: 86,067

[30] Foreign Application Priority Data

Nov. 7, 1969 Germany....................P 19 56 080.6

[52] U.S. Cl............178/5.4 R, 178/5.4 M, 178/7.3 D

[51] Int. Cl...............................................H04n 9/14

[58] Field of Search.........178/5.2, 5.2 A, 5.4, 5.4 M, 178/5.4 BD, 6.6 A, 6.6 TC, 6.7, 7.3 D, 7.5 D

[56] References Cited

UNITED STATES PATENTS

| | | | |
|---|---|---|---|
| R25,809 | 6/1965 | Johnson | 178/6.6 TC |
| 3,303,276 | 2/1967 | Haeff | 178/5.4 |
| 3,383,460 | 5/1968 | Pritchard | 178/5.4 BD |

*Primary Examiner*—Richard Murray
*Attorney*—Littlepage, Quaintance, Wray & Aisenberg

[57] ABSTRACT

A color television system using modulation and mechanical deflection to project several different monochromatic light beams onto a screen to form picture dots in a raster. Delay line systems is used to control modulation to correct for color errors and geometric distortion.

3 Claims, 2 Drawing Figures

Inventor:
Dr. R. von Felgel-Farnholz by
Littlepage, Quaintance, Wray & Aisenberg
Attorneys

COLOR TV REPRODUCTION UNIT USING LASER BEAMS

BACKGROUND OF THE INVENTION

This invention relates to a color TV reproduction unit, and especially a unit with which a color TV image can be made visible for several persons on a screen through the projection of light beams. It concerns the use of laser beams for generating the screen image. A number of suggestions have been made to create reproduction (i. e. playback) units with laser beams because highly intensive beam sources are available today in various colors so that the achievement of a color picture projection, through the use of several laser beams of complementary colors is possible.

So far, unlike electron beams, laser beams cannot be repeatedly deflected with electrical or magnetic fields. To bring about a scanning field of parallel lines on the reproduction picture screen, as in present-day television sets (for example, 625 lines, 25 frames), it has been necessary to use mechanical deflection means which are known from the early days of television engineering, such as, for example, two crossed polygonal reflectors or a Weiller's reflector screw.

In a color television process, one might either make the three laser beams, required for the production of a color dot, converge by means of a suitable lens system, or combine them into a single beam by means of semitransparent reflectors. If, in such a color system, a known modulation system is used for the modulation of the individual laser beams, for example, a Kerr cell arranged between two intersecting polarizers, then a dot is obtained that will light up in the desired color. By means of deflection of this dot, a color image is obtained.

This method for generating a color projection image however involves various difficulties which are connected primarily with the relatively low precision and the geometrical distortions of the known mechanical deflection means. The polygonal reflectors, used for deflection, must be ground extraordinarily accurately and must be so positioned that there will be no irregular lines or line intervals. Furthermore, the generation of a picture dot, produced by the convergence of several beams, implies the use of a relatively expensive set of lenses or of accurately adjusted dichroic deflectors.

SUMMARY OF THE INVENTION

The invention concerns a laser beam projection system for the reproduction of color TV images on a screen, in which only a relatively simple set of lenses and a mechanical deflection system with relatively large tolerances are needed.

The color TV reproduction unit (i. e. color TV set) is particularly suited for the projection of a color TV image upon a screen. Several essentially monochromatic light beams are amplitude modulated and are then gang-deflected by mechanically-moved optical deflection means in the direction of the line picture, so that they will describe a raster on the picture screen. The beams, which, prior to deflection, are oriented in parallel, hit the screen at three neighboring places. The color error, resulting from the shift of the light dot on the screen, can be adjusted with the help of adjustable delay-line networks, connected with the modulation devices for the individual light beams, in such a way that simultaneous color signals are reproduced in the area of one picture dot on the screen. In this way, the advantage is obtained that a dichroic reflector system becomes unnecessary and that the precision-mechanics accuracy of the mechanical deflection means need only be great enough so that the impact points of the individual beams on the screen will be several image-dot widths from each other. These shifts can then be compensated manually by adjusting the delay-line networks, which are connected in front of the modulation devices, in such a manner that the pertinent color signals of a picture dot will appear, instead of in several places, now only in one place, respectively, in the area of each single picture dot.

Another advantage consists in the fact that the geometrical distortions, which are due to the mechanical deflection system (for example, the tangent error), can be reduced considerably by controlling the delay-line networks. For this purpose, voltages can be derived, from the generators connected with the axes of the polygonal reflectors, which are supplied to the delay-line networks. By means of periodic variation of the transmission times, the moment of an otherwise shifted picture dot can be so shifted that the geometric appearance of the picture is thus improved.

It is also possible to arrange the three impact points of the beams along one line, as well as in other manners, given by the special geometry or the color picture-taking conditions. Thus it might also be useful to place the impact points of the beams, above each other, in three lines. In this case, the delay of the beams, brought about by the delay-line networks, must amount to about one or two line periods respectively. The parallel line-up of the beams prior to deflection, with which the arrangement of the three beams with respect to each other is also connected, can, for example, be achieved by focusing the beams on one point with the help of a big collecting lens and by orienting them parallel, in front of the focus, by means of a small dispersing lens. Through this optical arrangement, the position of the three laser beam sources is reproduced on the reception screen, on a considerably reduced scale. By shifting the three laser beam sources, along with their modulation devices, the desired configuration of the impact points upon the screens can then be adjusted.

BRIEF DESCRIPTION OF THE DRAWING

These and other advantages of the invention will be explained in greater detail below, with the help of an example, which is illustrated in the accompanying drawings, which illustrates a system according to the invention.

DESCRIPTION OF THE PREFERRED EMBODIMENT

Figures 1, 2:
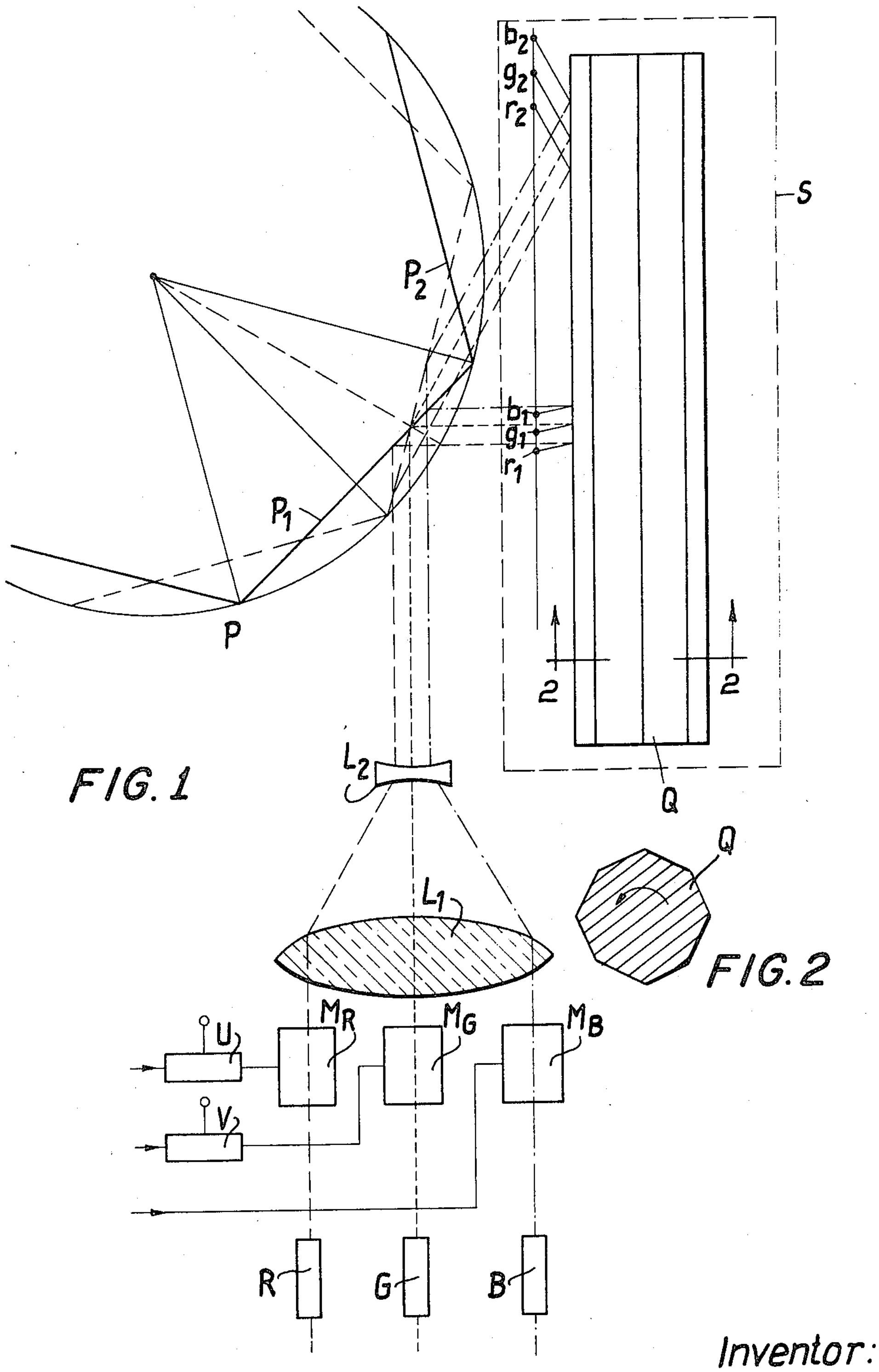
FIG. 1 illustrates the overall invention.
FIG. 2 is a cross-section illustration of a polygonal reflector used in the system of FIG. 1.

In FIG. 1, R, G, B are three laser beam sources which are adjusted among each other for the most accurate possible parallel position of the beams. These beams pass respectively through modulation devices $M_R$, $M_G$, and $M_B$ and then enter a reduction system, consisting of a converging lens $L_1$ and a dispersing lens $L_2$. These three beams are then reflected along respective lines by the reflectors P of a mechanical horizontal picture-deflection device, and the reflectors Q of a mechanical vertical picture-deflection device to reach the viewing screen S. The screen S is viewed from the same direction from which light strikes the screen. FIG. 1, with the polygon rotating to deflect light in the direction of the lines, shows the reflector P in a first position $P_1$ (indicated by unbroken lines) and a second position (one of many alternative positions) $P_2$ (indicated by broken lines).

As vertical deflection system, an eight-sided reflective polygon Q is used to direct light onto the screen. In FIG. 2, the polygon Q is illustrated in a section taken along lines 2—2' in a projection or perpendicular to the polygon's axis of rotation.

As a result of this focusing and deflection, there are impact points shown as $r_1$, $g_1$ and $b_1$ or $r_2$, $g_2$ and $b_2$ for the three beams, depending upon whether the polygonal reflector is in position $P_1$ or $P_2$. Additional intermediate positions, in connection with other positions of the polygonal reflector P, can be derived quite readily by viewing the drawing. It is preferable that the parallel beams, in the region between lens $L_2$ and reflector P, should be in parallel in a plane parallel to the raster lines on the screen S.

Due to the separation of the three impact points, *r*, *g*, *b*, the three color components are recorded along one line, although shifted toward each other by small intervals. Such an image impression would be extremely irritating. Above all, unnatural color transitions would develop along the edges of colored objects. To avoid these irregularities, delay-line networks U and V are connected into the lead wires going to the modulation devices $M_R$, $M_G$. Through these delay-line networks, the picture content of the lines moving along quickly in the direction of scanning is delayed as much as is required by the particular quickly-following beam, in order to reach a picture dot, which is hit by the first leading beam on the projection screen. In this way, the color errors along the edges of colored objects can be practically eliminated.

As is seen from FIG. 1, the impact points $r_1$, $g_1$ and $b_1$ are closer together, in the middle of the image, than are the impact points $r_2$, $g_2$, $b_2$ along the edge of the image. This error can be adjusted by means of automatic transmission time control of the delay lines U and V, by oppositely varying the transmission time by means of a voltage, derived from the drive system of the polygonal reflector P and, if necessary, Q.

Along the outermost side edges of the image, one or two of the impact points might vanish as a result of fade-out, so that no mixed color can be formed there anymore. But these edges are so narrow that they can be included in the so-called scanning gap.

When it is important to correct also the tangent error of the raster geometry, it is a good idea to introduce a controllable delay line into the lead wire of the modulation device $M_B$, so that all three beams are now so influenced, by suitable voltages, depending on the angle of deflection, in terms of their modulation, that the tangent error will be reduced quite considerably.

What is claimed is:

1. In a color television reproduction system for the projection of a color television image upon a screen comprising:
   A. source means for providing several, essentially monochromatic, light beams,
   B. means for amplitude modulating the beams in response to respective signals associated with respective individual types of colors, and
   C. deflection means for horizontally and vertically deflecting the light beams for describing a raster on said screen, the improvement comprising:
   D. optical means for adjusting the beams to line up in parallel, prior to deflection, and to hit the screen in three different places, and
   E. adjustable delay-line means for correcting the color error resulting from the relative displacement of light dots on the screen and connected to the modulating means whereby simultaneous color signals can be reproduced on the screen in a more visually acceptable form.

2. A television reproduction system according to claim 1, wherein the beams occur in parallel in one plane.

3. Television reproduction unit according to claim 1, comprising a combination of one convex and one concave cylinder lens for the parallel line-up of the beams, whereby the interval between the individual beams amounts to just a few image dots.

* * * * *